US007941316B2

(12) United States Patent
Mahajan et al.

(10) Patent No.: US 7,941,316 B2
(45) Date of Patent: May 10, 2011

(54) COMBINED SPEECH AND ALTERNATE INPUT MODALITY TO A MOBILE DEVICE

(75) Inventors: Milind V. Mahajan, Redmond, WA (US); Alejandro Acero, Bellevue, WA (US); Bo-June Hsu, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 11/262,230

(22) Filed: Oct. 28, 2005

(65) Prior Publication Data
US 2007/0100635 A1 May 3, 2007

(51) Int. Cl.
*G10L 15/26* (2006.01)
(52) U.S. Cl. ........................... 704/235; 704/231
(58) Field of Classification Search .................. 704/231, 704/235, 251
See application file for complete search history.

(56) References Cited

U.S. PATENT DOCUMENTS

| | | | |
|---|---|---|---|
| 6,304,844 B1 | 10/2001 | Pan et al. | |
| 6,359,971 B1 * | 3/2002 | Haimi-Cohen et al. | ... 379/88.01 |
| 7,310,600 B1 * | 12/2007 | Garner et al. | ................. 704/234 |
| 2002/0052742 A1 * | 5/2002 | Thrasher et al. | ............. 704/251 |
| 2002/0091520 A1 * | 7/2002 | Endo et al. | ..................... 704/235 |
| 2004/0153321 A1 | 8/2004 | Chung et al. | |
| 2004/0156562 A1 * | 8/2004 | Mulvey et al. | ................. 382/310 |
| 2006/0293889 A1 * | 12/2006 | Kiss et al. | ..................... 704/235 |

OTHER PUBLICATIONS

PCT Search Report, PCT/US2006/040537, mailed Jan. 20, 2007.
K. Kurihara et al., "Speech Pen: Predictive Handwriting based on Ambient Multimodal Recognition" In: Proceedings of the ACM Conference on Human Factors in Computing System (CHI 2006), ACM, Apr. 2006.
"European Search Report", Application No. EP/06/81/7051, Filed Date: Aug. 19, 2010, pp. 10.
Ogata, et al., "Speech Repair Quick Error Correction Just by Using Selection Operation for Speech Input Interfaces", Proceedings of the 9th European Conference on Speech Communication and Technology, Sep. 2005, pp. 133-136.
Extended PCT Search Report, PCT/US2006040537, mailed Aug. 19, 2010.
Ogata et al., "Speech Repair: Quick Error Correction Just by Using Selection Operation for Speech Input Interfaces", Proceedings of the 9th European Conference on Speech Communication and Technology, Sep. 2005, pp. 133-136.

\* cited by examiner

*Primary Examiner* — Richemond Dorvil
*Assistant Examiner* — Douglas C Godbold
(74) *Attorney, Agent, or Firm* — Christopher J. Volkmann; Westman, Champlin & Kelly, P.A.

(57) ABSTRACT

A method of entering information into a mobile device includes receiving a multi-word speech input from a user, performing speech recognition on the speech input to obtain a multi-word speech recognition result, and sequentially displaying, in a display, words in the speech recognition result for user confirmation or correction, by adding one word at a time to the display. A next word is only displayed after user confirmation or correct has been received for a previously displayed word that is immediately preceding the next word in the speech recognition result. The method also includes calculating a hypothesis lattice indicative of a plurality of speech recognition hypotheses based on the speech input and, prior to finishing calculating the hypothesis lattice and while continuing to calculate the hypothesis lattice, calculating a preliminary hypothesis lattice indicative of only partial speech recognition hypotheses based on the speech input and outputting the preliminary hypotheses lattice.

17 Claims, 12 Drawing Sheets demonstrates demonstration 
demonstrates 
demonstrate
demonstrated

COMBINED SPEECH AND ALTERNATE INPUT MODALITY TO A MOBILE DEVICE

BACKGROUND

Text entry on relatively small mobile devices, such as cellular telephones and personal digital assistants is growing in popularity due to an increase in use of applications for such devices. Some such applications include electronic mail (e-mail) and short message service (SMS).

However, mobile phones, personal digital assistants (PDAs), and other such mobile devices, in general, do not have a keyboard which is as convenient as that on a desktop computer. For instance, mobile phones tend to have only a numeric keypad on which multiple letters are mapped to the same key. Some PDAs have only touch sensitive screens that receive inputs from a stylus or similar item.

Thus, such devices currently provide interfaces that allow a user to enter text, through the numeric keypad or touch screen or other input device, using one of a number of different methods. One such method is a deterministic interface known as a multi-tap interface. In the multi-tap interface, the user depresses a numbered key a given number of times, based upon which corresponding letter the user desires. For example, when a keypad has the number "2" key corresponding to the letters "abc", the keystroke "2" corresponds to "a", the keystrokes "22" correspond to "b", the keystrokes "222" correspond to "c", and the keystrokes "2222" correspond to the number "2". In another example, the keystroke entry 8 44 444 7777 would correspond to the word "this".

Another known type of interface is a predictive system and is known as the T9 interface by Tegic Communications. The T9 interface allows a user to tap the key corresponding to a desired letter once, and uses the previous keystroke sequence to predict the desired word. Although this reduces the number of key presses, this type of predictive interface suffers from ambiguity that results from words that share the same key sequences. For example, the key sequence "4663" could correspond to the words "home", "good", "gone", "hood", or "hone". In these situations, the interface displays a list of predicted words generated from the key sequence and the user presses a "next" key to scroll through the alternatives. Further, since words outside the dictionary, or outside the vocabulary of the interface, cannot be predicted, T9-type interfaces are often combined with other fallback strategies, such as multi-tap, in order to handle out of vocabulary words.

Some current interfaces also provide support for word completion and word prediction. For example, based on an initial key sequence, of "466" (which corresponds to the letters "goo") one can predict the word "good". Similarly, from an initial key sequence, "6676" (which corresponds to the letters "morn") one can predict the word "morning". Similarly, one can predict the word "a" as the next word following the word sequence "this is" based on an n-gram language model prediction.

None of these interfaces are truly susceptible of any type of rapid text entry. In fact, novice users of these methods often achieve text entry rates of only 5-10 words per minute.

In order to increase the information input bandwidth on such communication devices, some devices implement speech recognition. Speech has a relatively high communication bandwidth which is estimated at approximately 250 words per minute. However, the bandwidth for text entry using conventional automatic speech recognition systems is much lower in practice due to the time spent by the user in checking for, and correcting, speech recognition errors which are inevitable with current speech recognition systems.

In particular, some current speech based text input methods allow users to enter text into cellular telephones by speaking an utterance with a slight pause between each word. The speech recognition system then displays a recognition result. Since direct dictation often results in errors, especially in the presence of noise, the user must select mistakes in the recognition result and then correct them using an alternatives list or fallback entry method.

Isolated word recognition requires the user to speak only one word at a time. That one word is processed and output. The user then corrects that word. Although isolated word recognition does improve recognition accuracy, an isolated word recognition interface is unnatural and reduces the data entry rate over that achieved using continuous speech recognition, in which a user can speak an entire phrase or sentence at one time.

However, error correction in continuous speech recognition presents problems. Traditionally, speech recognition results for continuous speech recognition have been presented by displaying the best hypothesis for the entire phrase or sentence. To correct errors, the user then selects the misrecognized word and chooses an alternative from a drop down list. Since errors often occur in groups and across word boundaries, many systems allow for correcting entire misrecognized phrases. For example the utterance "can you recognize speech" may be incorrectly recognized as "can you wreck a nice beach". In this case, it is simply not possible to correct the recognition a word at a time due to incorrect word segmentation. Thus, the user is required to select the phrase "wreck a nice beach" and choose an alternate for the entire phrase.

While such an approach may work well when recognition accuracy is high and a pointing device such as a mouse, is available, it becomes cumbersome on mobile devices without a pointer and where recognition accuracy cannot be assumed, given typically noisy environments and limited processor capabilities. On a device with only hardware buttons, a keypad or a touch screen, or the like, it is difficult to design an interface that allows users to select a range of words for correction, while keeping keystrokes to a reasonable number.

The discussion above is merely provided for general background information and is not intended to be used as an aid in determining the scope of the claimed subject matter.

SUMMARY

The present invention uses a combination of speech and alternate modality inputs (such as keypad inputs) to transfer information into a mobile device. The user speaks an utterance which includes multiple words (such as a phrase or sentence). The speech recognition result is then presented to the user, one word at a time, for confirmation or correction. The user is presented, on screen, with the best hypothesis and a selection list, for one word at a time, beginning with the first word. If the best hypothesis word presented on the screen is correct, the user can simply indicate that. Otherwise, if the desired word is in the alternatives list, the user can quickly navigate to the alternatives list and enter the word using one of a variety of alternate input modalities, with very little effort on the part of the user (e.g., with few button depressions, keystrokes, etc.).

In one embodiment, the user can start entering the word using a keypad, if it is not found on the alternatives list. Similarly, in one embodiment, the system can recompute the best hypothesis word and the alternates list using the a posteriori probability obtained by combining information from the keypad entries for the prefix of the word, the speech recognition result lattice, words prior to the current word which have already been corrected, a language model, etc. This process can be repeated for subsequent words in the input sentence.

Other input modalities, such as a soft keyboard, touch screen inputs, handwriting inputs, etc. can be used instead of the keypad input or in addition to it.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present invention deals with combining speech and alternate input modalities in order to improve text entry efficiency and robustness on mobile devices. However, prior to describing the present invention in more detail, one illustrative environment in which the present invention can be used will be described.

Computing device 10 shown below in FIG. 1 typically includes at least some form of computer readable media. Computer readable media can be any available media that can be accessed by device 10. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which are part of, or can be accessed by device 10. Communication media typically embodies computer readable instructions, data structures, program modules or other data in a modulated data signal such as a carrier wave or other transport mechanism and includes any tangible information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 1:
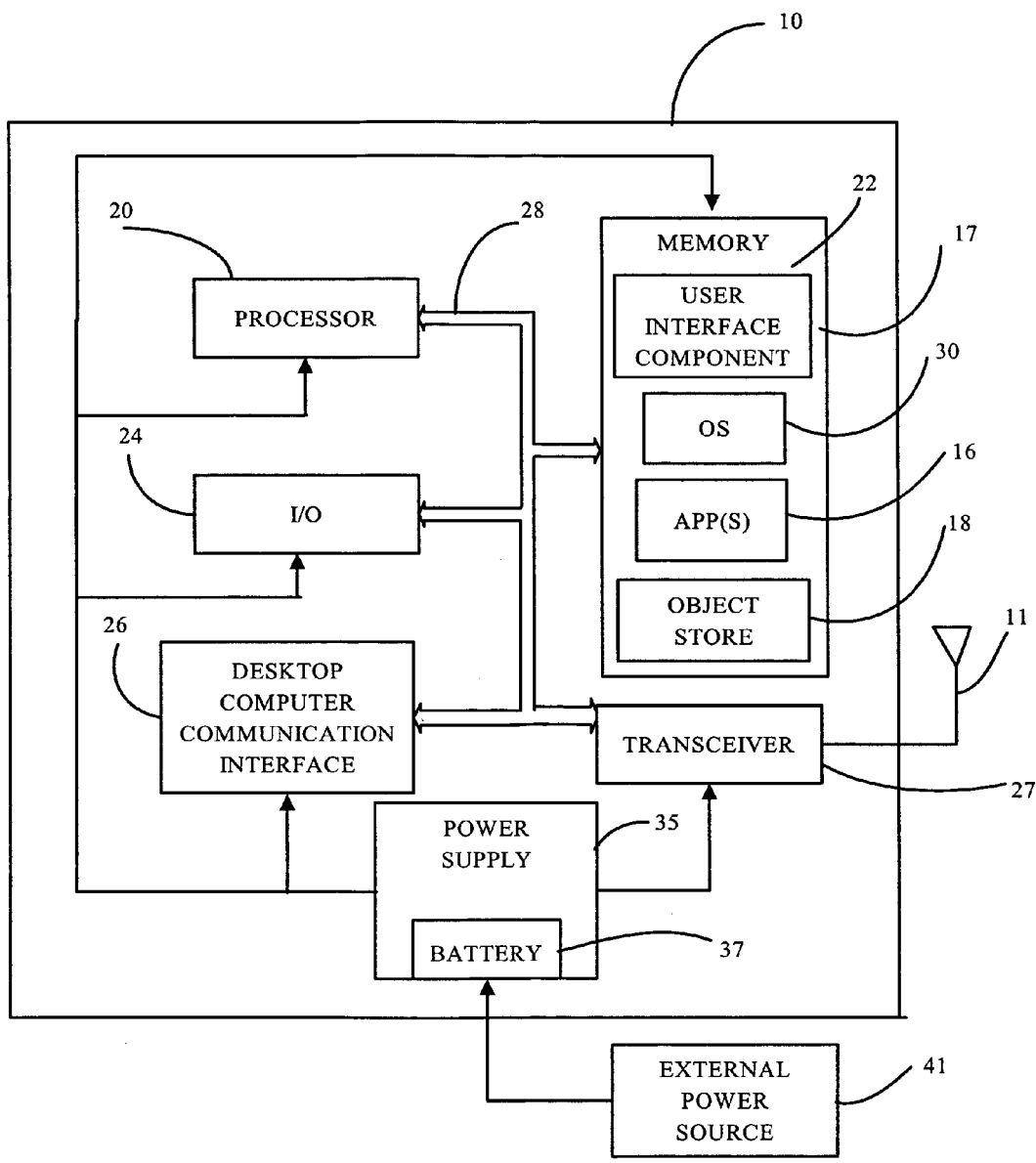
FIG. 1 is a block diagram of one illustrative computing environment in which the present invention can be used.

FIG. 1 is a block diagram of one embodiment of a mobile device 10. As shown, the mobile device 10 includes a processor 20, memory 22, input/output (I/O) components 24, a desktop computer communication interface 26, transceiver 27 and antenna 11. In one embodiment, these components of the mobile device 10 are coupled for communication with one another over a suitable bus 28. Although not shown in FIG. 2, mobile device 10 also includes within I/O component 24, a microphone as illustrated and discussed below with respect to FIG. 5.

Memory 22 is implemented as non-volatile electronic memory such as random access memory (RAM) with a battery back-up module (not shown) such that information stored in memory 22 is not lost when the general power to the mobile device 10 is shut down. A portion of memory 22 is allocated as addressable memory for program execution, while other portions of memory 22 can be used for storage, such as to simulate storage on a disk drive.

Memory 22 includes an operating system 30, application programs 16 (such as user interface applications, personal information managers (PIMs), scheduling programs, word processing programs, spreadsheet programs, Internet browser programs, and speech recognition programs discussed below), a user interface component 17 and an object store 18. During operation, the operating system 30 is loaded into, and executed by, the processor 20 from memory 22. The operating system 30, in one embodiment, is a Windows CE brand operating system commercially available from Microsoft Corporation. The operating system 30 can be designed for mobile devices, and implements features which can be utilized by PIMs, content viewers, speech recognition functions, etc. This can be done in any desired way such as through exposed application programming interfaces or through proprietary interfaces or otherwise. The objects in object store 18 can be maintained by PIMs, content viewers and the operating system 30, at least partially in response to calls thereto.

User interface component 17 illustratively interacts with other components to provide output displays to a user and to receive inputs from the user. One embodiment of the operation of user interface component 17 in receiving user inputs as combinations of speech and keypad inputs is described below with respect to FIGS. 6A-8.

The I/O components 24, in one embodiment, are provided to facilitate input and output operations from the user of the mobile device 10. Such components can include, among other things, displays, touch sensitive screens, keypads, the microphone, speakers, audio generators, vibration devices, LEDs, buttons, rollers or other mechanisms for inputting information to, or outputting information from, device 10. These are listed by way of example only. They need not all be present, and other or different mechanisms can be provided. Also, other communication interfaces and mechanisms can be supported, such as wired and wireless modems, satellite receivers and broadcast tuners, to name a few.

The desktop computer communication interface 26 is optionally provided as any suitable, and commercially available, communication interface. The interface 26 is used to communicate with a desktop or other computer 12 when wireless transceiver 27 is not used for that purpose. Interface 26 can include, for example, an infrared transceiver or serial or parallel connection.

The transceiver 27 is a wireless or other type of transceiver adapted to transmit signals or information over a desired transport. In embodiments in which transceiver 27 is a wireless transceiver, the signals or information can be transmitted using antenna 11. Transceiver 27 can also transmit other data over the transport. In some embodiments, transceiver 27 receives information from a desktop computer, an information source provider, or from other mobile or non-mobile devices or telephones. The transceiver 27 is coupled to the bus 28 for communication with the processor 20 to store information received and to send information to transmit.

A power supply 35 includes a battery 37 for powering the mobile device 10. Optionally, the mobile device 10 can receive power from an external power source 41 that overrides or recharges the built-in battery 37. For instance, the external power source 41 can include a suitable AC or DC adapter, or a power docking cradle for the mobile device 10.

It will be noted that FIG. 1 illustrates an example of a suitable operating environment shown in FIG. 1 in which the invention may be implemented. The operating environment shown in FIG. 1 is only one example of a suitable operating environment and is not intended to suggest any limitation as to the scope of use or functionality of the invention. Other well known computing systems, environments, and/or configurations that may be suitable for use with the invention include, but are not limited to, cellular telephones, personal digital assistants, pagers, hand-held or laptop devices, multiprocessor systems, microprocessor-based systems, programmable consumer electronics, distributed computing environments that include any of the above systems or devices, and the like.

It will also be noted that the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 2:
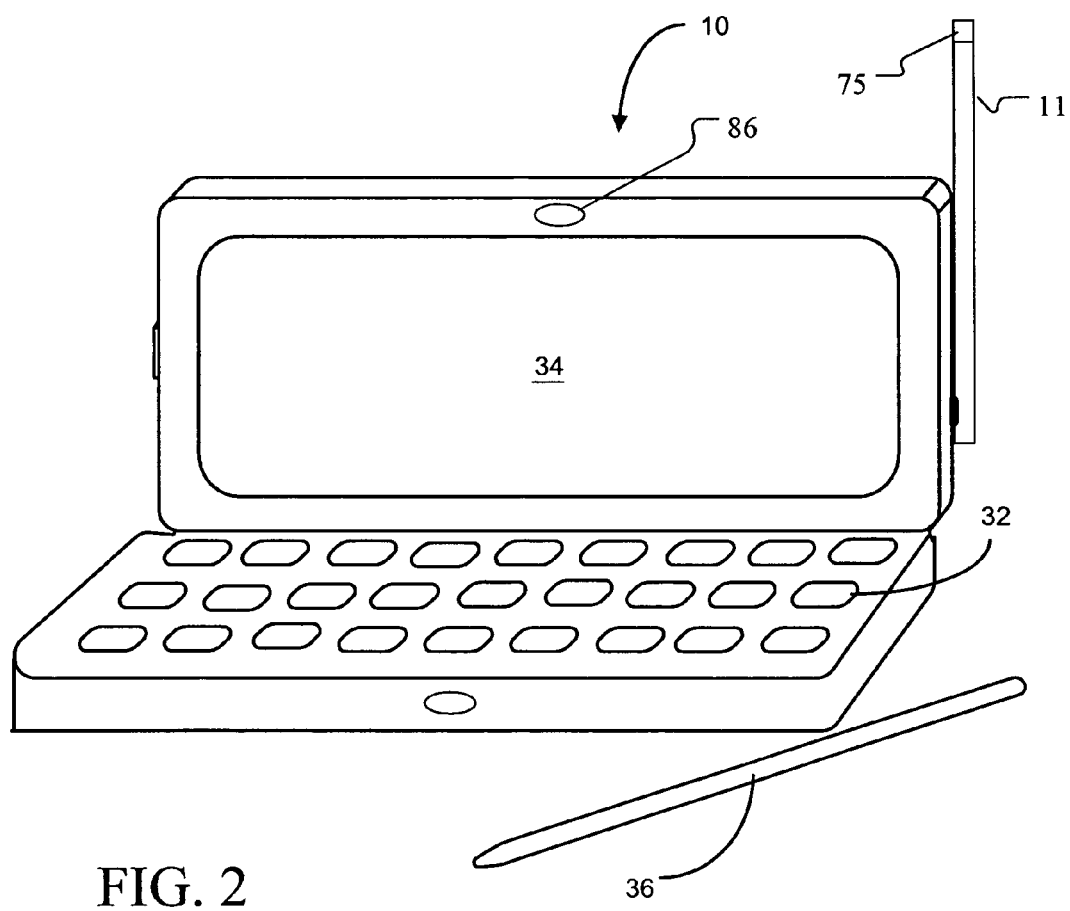
FIGS. 2-4 illustrate different exemplary, simplified pictorial embodiments of devices on which the present invention can be deployed.

FIG. 2 is a simplified pictorial illustration of one embodiment of the mobile device 10 which can be used in accordance with the present invention. In this embodiment, in addition to antenna 11 and microphone 75, mobile device 10 includes a miniaturized keyboard 32, a display 34, a stylus 36, and a speaker 86. In the embodiment shown in FIG. 3, the display 34 is a liquid crystal display (LCD) which uses a contact sensitive display screen in conjunction with the stylus 36. The stylus 36 is used to press or contact the display 34 at designated coordinates to accomplish certain user input functions. The miniaturized keyboard 32 is implemented as a miniaturized alpha-numeric keyboard, with any suitable and desired function keys which are also provided for accomplishing certain user input functions. Microphone 75 is shown positioned on a distal end of antenna 11, but it could just as easily be provided anywhere on device 10.

Figure 3:
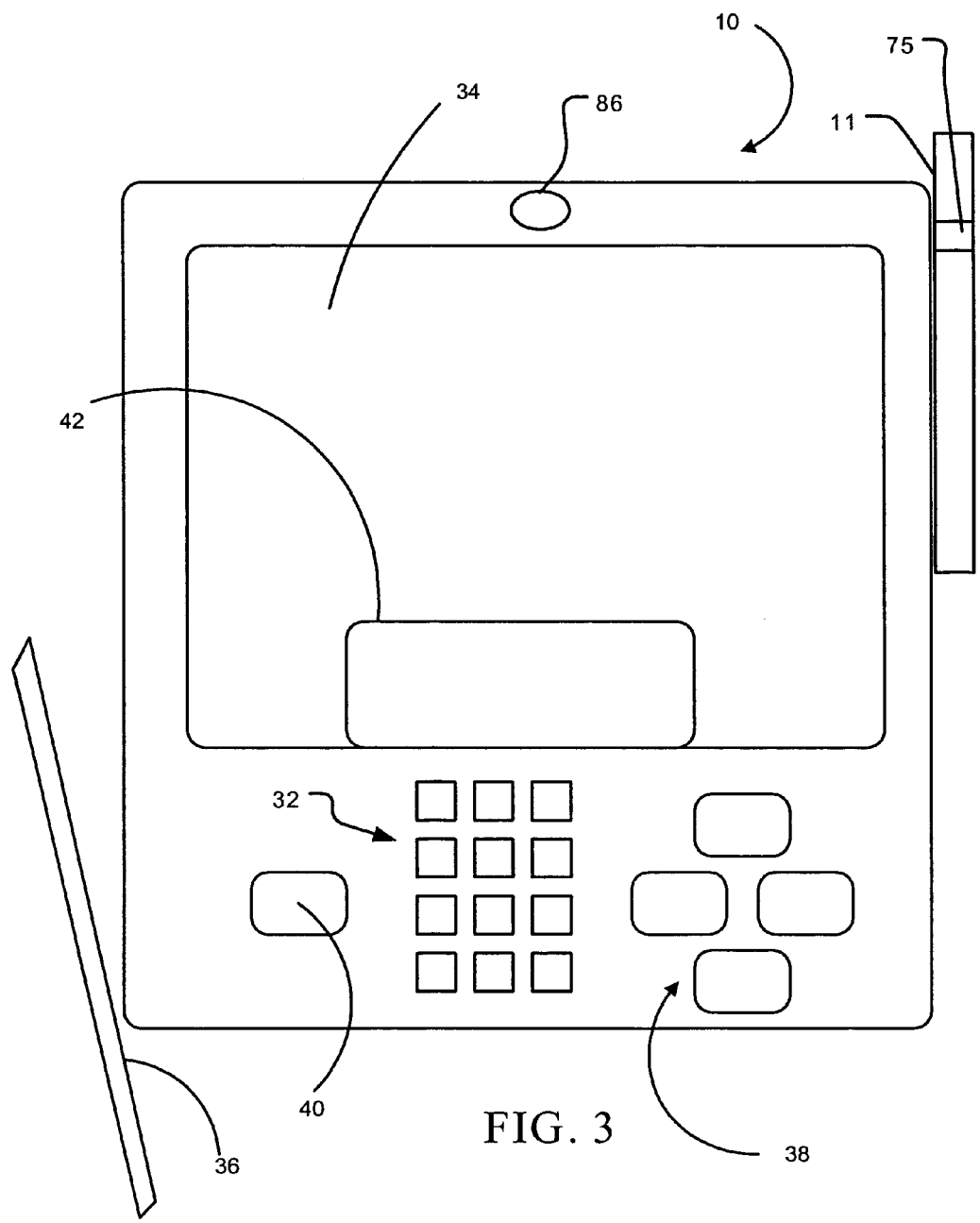

FIG. 3 is another simplified pictorial illustration of the mobile device 10 in accordance with another embodiment of the present invention. The mobile device 10, as illustrated in FIG. 3, includes some items which are similar to those described with respect to FIG. 2, and are similarly numbered. For instance, the mobile device 10, as shown in FIG. 3, also includes microphone 75 positioned on antenna 11 and speaker 86 positioned on the housing of the device. Of course, microphone 75 and speaker 86 could be positioned other places as well. Also, mobile device 10 includes touch sensitive display 34 which can be used, in conjunction with the stylus 36, to accomplish certain user input functions. It should be noted that the display 34 for the mobile devices shown in FIGS. 2 and 3 can be the same size, or of different sizes, but will typically be much smaller than a conventional display used with a desktop computer. For example, the displays 34 shown in FIGS. 2 and 3 may be defined by a matrix of only 240×320 coordinates, or 160×160 coordinates, or any other suitable size.

The mobile device 10 shown in FIG. 3 also includes a number of user input keys or buttons (such as scroll buttons 38 and/or keyboard 32) which allow the user to enter data or to scroll through menu options or other display options which are displayed on display 34, without contacting the display 34. In addition, the mobile device 10 shown in FIG. 3 also includes a power button 40 which can be used to turn on and off the general power to the mobile device 10.

It should also be noted that in the embodiment illustrated in FIG. 3, the mobile device 10 can include a hand writing area 42. Hand writing area 42 can be used in conjunction with the stylus 36 such that the user can write messages which are stored in memory 22 for later use by the mobile device 10. In one embodiment, the hand written messages are simply stored in hand written form and can be recalled by the user and displayed on the display 34 such that the user can review the hand written messages entered into the mobile device 10. In another embodiment, the mobile device 10 is provided with a character recognition module such that the user can enter alpha-numeric information into the mobile device 10 by writing that alpha-numeric information on the area 42 with the stylus 36. In that instance, the character recognition module in the mobile device 10 recognizes the alpha-numeric characters and converts the characters into computer recognizable alpha-numeric characters which can be used by the application programs 16 in the mobile device 10.

Figure 4:
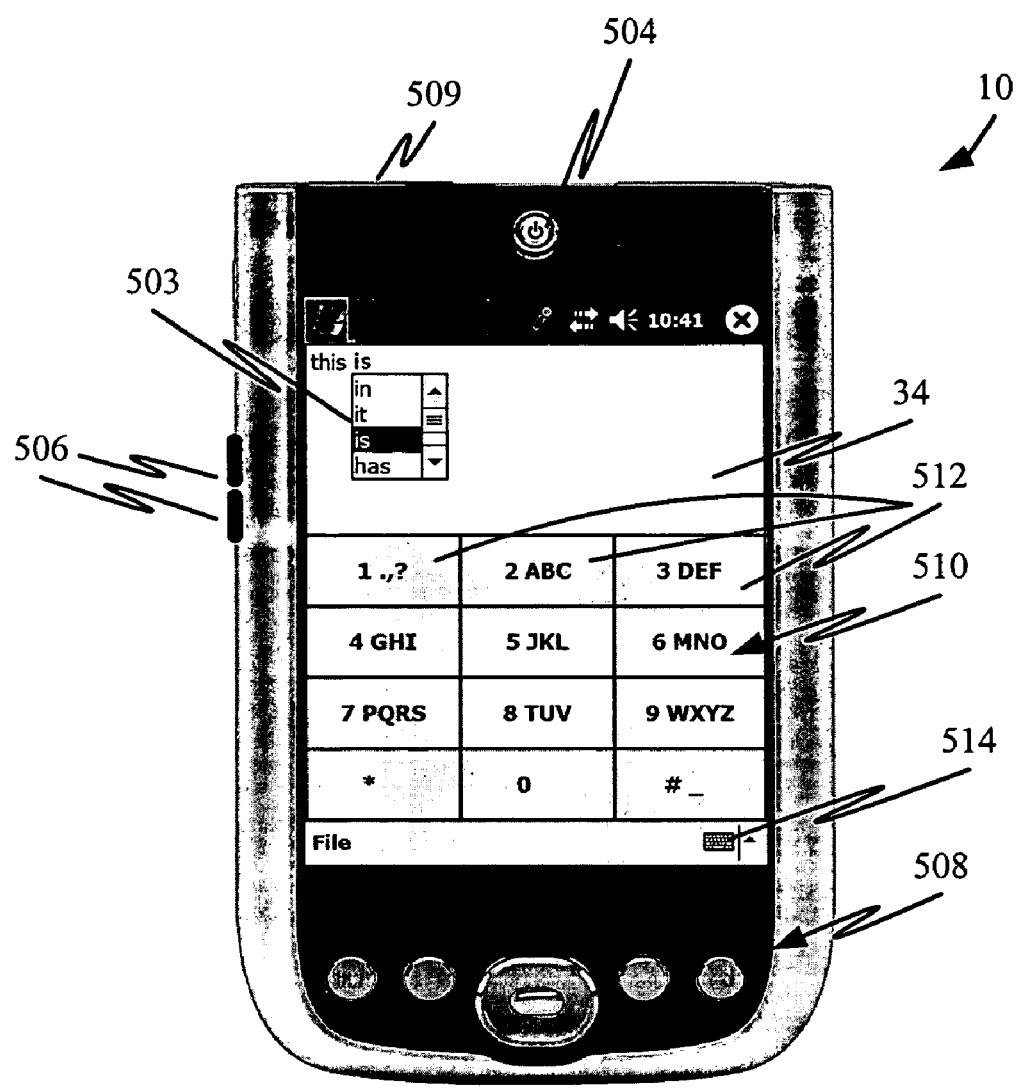

FIG. 4 illustrates a pictorial illustration of another embodiment of mobile device 10 in accordance with one embodiment of the invention. Mobile device 10 has a display area 34, a power button 504, a plurality of control buttons 506, a cluster of additional control buttons 508, a microphone 509 and a keypad area 510. Keypad area 510 illustratively includes a plurality of different alphanumeric buttons (some of which are illustrated by numeral 512) and can also include a keyboard button 514. The user can enter alphanumeric information into the device 10 shown in FIG. 4 by using a stylus or finger, or other mechanism, to depress buttons 512. Any of the various letter entry techniques can be used to enter alphanumeric information through buttons 512, such as the deterministic multi-tap method, a predictive technique, etc. Similarly, in one embodiment, if the user desires to switch to more of a typing method, the user can simply actuate the keyboard button 514. In that case, the device 10 displays a reduced depiction of a conventional keyboard, instead of alphanumeric buttons 512. The user can then enter textual information, one letter at a time, by tapping those letters on the displayed keyboard using a stylus, etc. Further, other alternate input modalities can be used in various embodiments as well, such as handwriting input and other touch screen or other inputs.

In one embodiment, device 10 also includes a speech recognition system (which will be described in greater detail below with respect to FIG. 5) so that the user can enter speech information into device 10 through microphone 509. Similarly, device 10 illustratively includes an interface run by interface component 17 (in FIG. 1) which allows a user to combine speech and keypad inputs to enter information into device 10. This improves text entry efficiency and robustness, particularly on mobile devices which do not have conventional keyboards. This is described in greater detail below with respect to FIGS. 6A-8.

Figure 5:
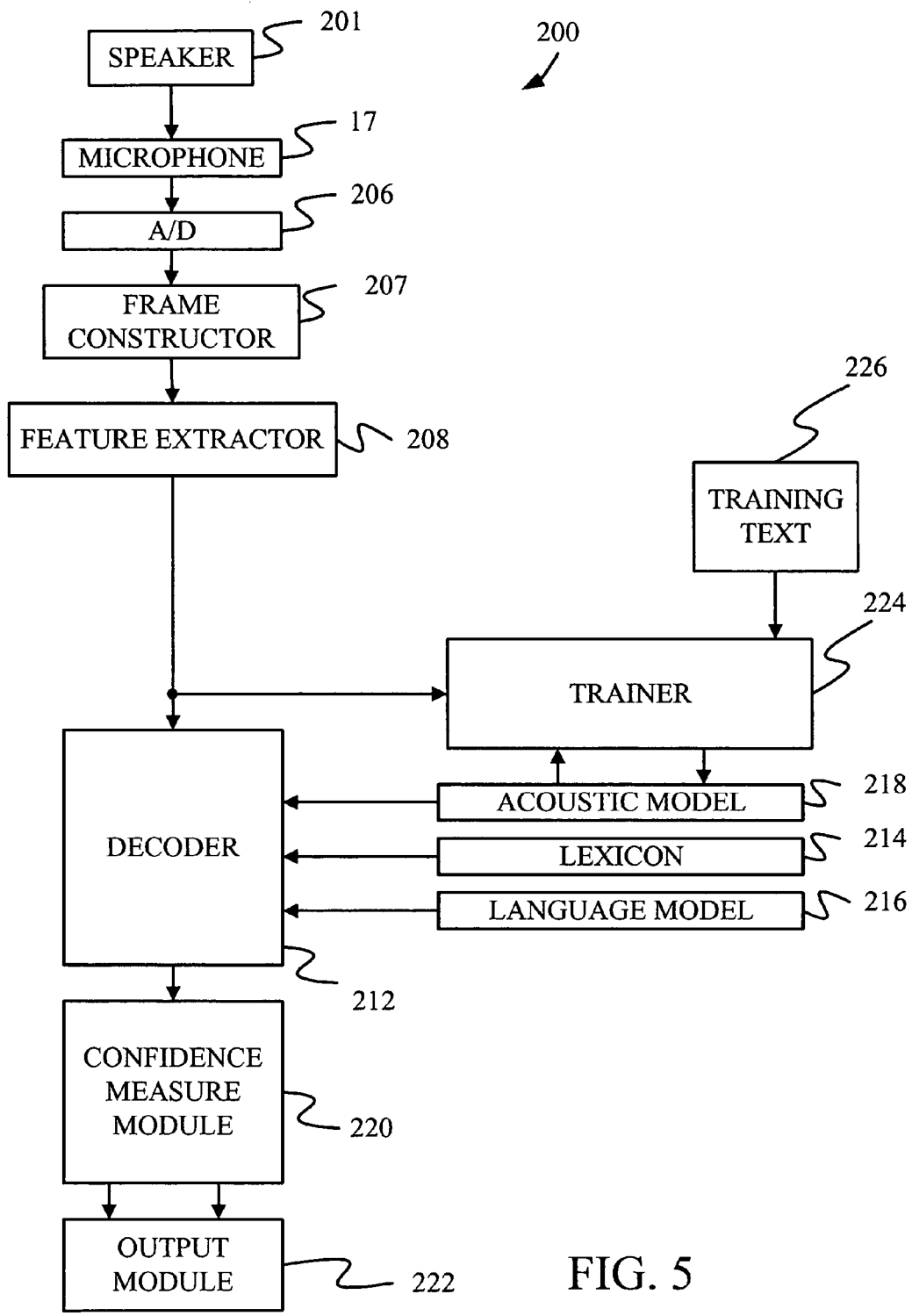
FIG. 5 illustrates one illustrative embodiment of a speech recognition system.

FIG. 5 is a block diagram of one illustrative embodiment of a speech recognition system 200 which can be used on any of the mobile devices shown in FIGS. 2-4 above, in accordance with one embodiment.

In FIG. 5, a speaker 201 (either a trainer or a user) speaks into a microphone 17. The audio signals detected by microphone 17 are converted into electrical signals that are provided to analog-to-digital (A-to-D) converter 206.

A-to-D converter 206 converts the analog signal from microphone 17 into a series of digital values. In several embodiments, A-to-D converter 206 samples the analog signal at 16 kHz and 16 bits per sample, thereby creating 32 kilobytes of speech data per second. These digital values are provided to a frame constructor 207, which, in one embodiment, groups the values into 25 millisecond frames that start 10 milliseconds apart.

The frames of data created by frame constructor 207 are provided to feature extractor 208, which extracts a feature from each frame. Examples of feature extraction modules include modules for performing Linear Predictive Coding (LPC), LPC derived Cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module produces a stream of feature vectors that are each associated with a frame of the speech signal.

Noise reduction can also be used so the output from extractor 208 is a series of "clean" feature vectors. If the input signal is a training signal, this series of "clean" feature vectors is provided to a trainer 224, which uses the "clean" feature vectors and a training text 226 to train an acoustic model 218 or other models as described in greater detail below.

If the input signal is a test signal, the "clean" feature vectors are provided to a decoder 212, which identifies a most likely sequence of words based on the stream of feature vectors, a lexicon 214, a language model 216, and the acoustic model 218. The particular method used for decoding is not important to the present invention and any of several known methods for decoding may be used.

The most probable sequence of hypothesis words is provided as a speech recognition lattice to a confidence measure module 220. Confidence measure module 220 identifies which words are most likely to have been improperly identified by the speech recognizer, based in part on a secondary acoustic model (not shown). Confidence measure module 220 then provides the sequence of hypothesis words in the lattice to an output module 222 along with identifiers indicating which words may have been improperly identified. Those skilled in the art will recognize that confidence measure module 220 is not necessary for the practice of the present invention.

Figure 6:
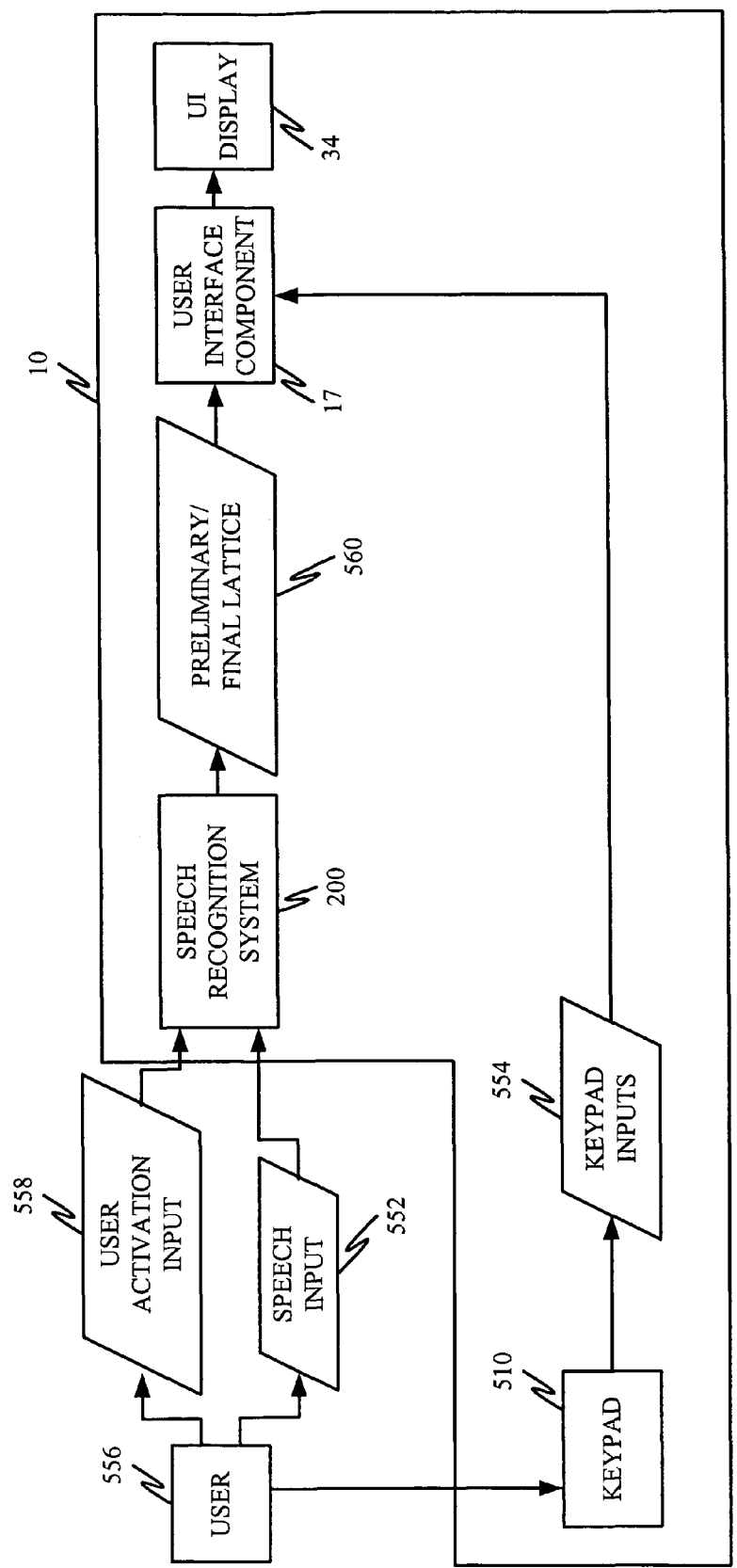
FIG. 6 is a block diagram of a device configured to implement a user interface system in accordance with one embodiment.
Figure 6A:
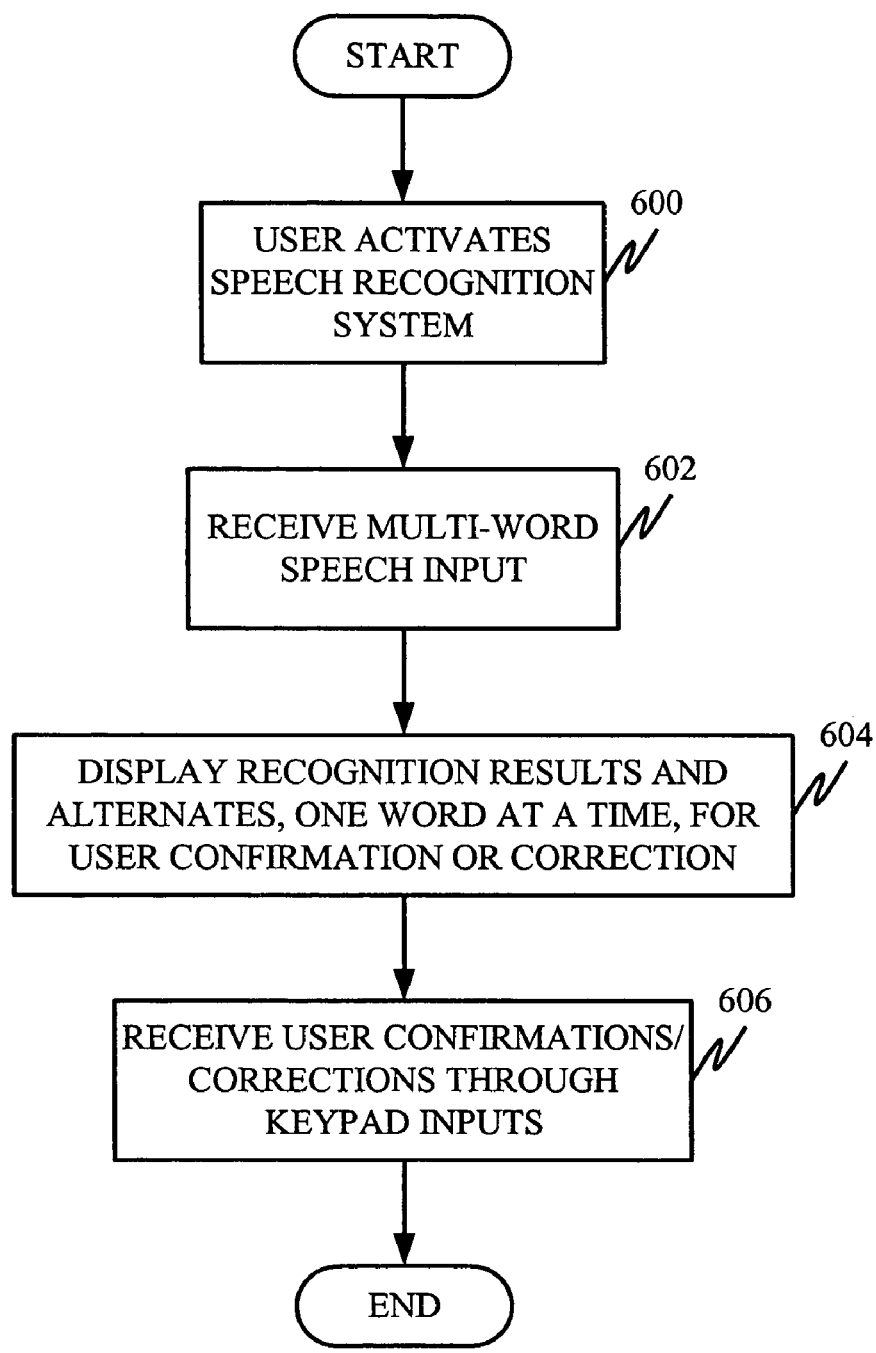
FIG. 6A is a flow diagram illustrating one embodiment of overall operation of the system shown in FIGS. 1-6.

FIG. 6 is a block diagram of a user interface system 550 in which device 10 is configured to implement an interface in accordance with one embodiment of the invention. FIG. 6A is a flow diagram illustrating the operation of the mobile device 10, and its interface, in accordance with one embodiment, and FIGS. 6 and 6A will be described in conjunction with one another. While the interface can be deployed on any of the mobile devices discussed above with respect to FIGS. 2-4, the present discussion will proceed with respect to device 10 shown in FIG. 4, for the sake of example only.

In accordance with one embodiment of the invention, the interface allows a user to combine both speech inputs 552 and alternate modality inputs 554 in order to input information into device 10. The alternate modality inputs can be inputs using any of the above-described modalities (soft keyboard, touch screen inputs, handwriting recognition, etc.). However, the alternate modality inputs will be described herein in terms of keypad inputs 554 for the sake of example only. Therefore, in accordance with one embodiment, the user 556 first activates the speech recognition system 200 on device 10, such as by holding down a function button or actuating any other desired button on the user interface to provide an activation input 558. This is indicated by block 600 in FIG. 6A. Next, the user speaks a multi-word speech input 552 (such as a phrase or sentence) into microphone 75 on device 10, and the speech recognition system 200 within device 10 receives the multi-word speech input 522. This is indicated by block 602 in FIG. 5A. Speech recognition system 200 generates speech recognition results in the form of a hypothesis lattice 560 and provides lattice 560 to user interface component 17. Next, user interface component 17, sequentially displays (at user interface display 34) the speech recognition results, one word at a time, for user confirmation or correction using the keypad 510. This is indicated by block 604 in FIG. 5A. The user illustratively uses the keys on keypad 510 to either correct each word, as it is displayed in sequence, or confirms that the word is correct. As the sequential commit continues, corrected or confirmed words are displayed and a next sequential word is added to the display for correction or confirmation. This continues until the entire speech recognition result is displayed.

At first glance, the combination of continuous speech recognition with a word-by-word correction mechanism (sometimes referred to herein as a sequential commit mechanism) may appear to be sub optimal and is certainly counter-intuitive. However, it is believed that this contributes to a better overall user experience, given current automatic speech recognition systems on mobile devices.

For instance, automatic speech recognition errors often involve segmentation errors. As discussed in the background section, the hypothetical phrase "recognized speech" may be misrecognized by an automatic speech recognition system as "wreck a nice beach". In this case, showing the full automatic speech recognition result leads to difficult choices for the correction interface. Some questions which this leads to are: Which words should the user select for correction? When the user attempts to correct the word "wreck", should it cause the rest of the phrase in the speech recognition result to change? How would it affect the confidence level of the user, if other words begin changing as a side effect of user corrections to a different word?

All of these questions must be resolved in designing the interface, and an optimum solution to all of these questions may be very difficult to obtain. Similarly, in addressing each of these questions, and providing user interface options for the user to resolve them, often results in a relatively large number of keystrokes being required for a user to correct a misrecognized sentence or phrase.

By contrast, substantially all of these issues are avoided by presenting word-by-word results, sequentially from left to right, for either user confirmation or correction. In the hypothetical misrecognition of "wreck a nice beach", the present invention would first present only the word "wreck" on the display portion 34 of device 10 for user confirmation or correction. Along with the word "wreck" the present system would illustratively display alternates as well. Therefore, the recognition result would likely include "recognize" as the second alternate to the word "wreck". Once the user has corrected "wreck" to "recognize", the present system illustratively recalculates probabilities associated with the various speech recognition hypotheses and would then output the next word as "speech" as the top hypothesis, instead of "a" given the context of the previous correction ("wreck" to "recognize") made by the user.

In one illustrative embodiment, and as shown in FIG. 4, the display portion 34 displays the speech recognition results along with a drop down menu 503 which displays the various alternates for the word currently being confirmed or corrected. The user might simply actuate an "Ok" button if the displayed word in the speech recognition result is correct, or the user can scroll down through the various alternates shown in drop down menu 503, and select the correct alternate for the displayed word. In the embodiment illustrated, the "Ok" button can be in the function button cluster 508 or it can on keypad 510, or it can be one of buttons 506, etc. Of course, other embodiments can be used as well.

More specifically, in the example shown in FIG. 4 with device 10, the user has entered the speech input 552 "this is speech recognition". The system has then displayed to the user the first word "this" and it has been confirmed by the user. The system in FIG. 4 is shown having displayed the second word in the recognition hypothesis to the user, and the user has selected "is" from the alternates list in drop down menu 503. The system then recomputes the probabilities associated with the various recognition hypotheses in order to find the most likely word to be displayed as the third word in the hypothesis, which is not yet shown in FIG. 4.

In one illustrative embodiment, the alternates drop down menu 503 is a floating list box that appears under the current insertion point in the hypothesized speech recognition results, and a currently selected prediction is displayed in line with the recognition result. The display is formatted to highlight the specified prefix. In addition, in one illustrative embodiment, the height of the list in box 503 may be set to any desirable number, and it is believed that a list of approximately four visible items limits the amount of distraction the prediction list introduces. Similarly, the width of drop down menu 503 can be adjusted to the longest word in the list. Further, if the insertion point in the recognition result is too close to the boundary of the document window such that the list box in drop down menu 503 extends beyond the boundary, the insertion point in the recognition result, and the prediction list in drop down menu 503, can wrap to the next line.

Receiving the user confirmations or corrections as keypad inputs 554 through the keypad 510 is shown by block 606 in FIG. 6A. Of course, it will be noted that the user can provide the keypad inputs 554 in a variety of different ways, other than simply selecting an alternate from the alternates drop down menu 503.

With perfect speech recognition, the user need only press "Ok" for each correctly recognized word, yielding very efficient text entry. However, with imperfect speech recognition, the user presses "Ok" for the correctly recognized words and can either scroll down to a desired alternate and select it from the alternates menu 503, or can begin to spell the correct word one letter at a time, until the desired word shows up in the prediction list in drop down menu 503, for misrecognized words.

The suggested word and the alternates first displayed to the user based on the various user inputs just described are illustratively taken from hypothesis lattice 560 generated from the speech recognition system 200 in response to the speech input 552. However, it may happen that the speech recognition system 200 has misrecognized the speech input to such an extent that the correct word to be displayed actually does not appear in the hypothesis lattice 560. To handle words that do not appear in the lattice 560, predictions from the hypothesis lattice 560 can be merged with predictions from a language model (such as an n-gram language model) and sorted by probability. In this way, words in the vocabulary of the speech recognition system 200, even though they do not appear in the hypothesis lattice 560 for the recognition result, can often be entered without spelling out the entire word, an in some cases, without typing a single letter. This significantly reduces the keystrokes required to enter words not found in the original recognition lattice 560.

It may also happen that the word entered by the user not only does not appear in the recognition lattice 560, but does not appear in the lexicon or vocabulary of the speech recognition system 200. In that case, user interface component 17, in one embodiment, is configured to switch to a deterministic letter-by-letter entry configuration that allows the user to spell the words through keypad 510 that are out of vocabulary. Such letter-by-letter configurations can include, for instance, a multi-tap input configuration or a keyboard input configuration.

For the keyboard configuration, device 10 shown in FIG. 4 includes soft keyboard key 514. When that key is actuated by a user, a display of a keyboard is shown and the user can simply use "hunt-and-peck" using a stylus to enter words, letter-by-letter, that are not in the original vocabulary of the speech recognition system 200. Those words can then be added to the vocabulary, as desired.

Similarly, instead of having a constantly displayed keyboard button 514, a keyboard option may be provided at the end of the alternates display in drop down menu 503 (or at any other position in the drop down menu 503). When the user actuates that option from the alternates list, the keyboard is again displayed and the user can enter letters, one at a time. Once the out of vocabulary word is committed, the keyboard illustratively disappears and user interface component 17 in device 10 shifts back into its previous mode of operation (which may be displaying one word at a time for confirmation or correction by the user) as described above.

Speech recognition latency can also be a problem on mobile devices. However, because the present system is a sequential commit system (in that it provides the speech recognition results to the user for confirmation or correction, one word at a time, beginning at the left of the sentence and proceeding to the right) the present system can take advantage of intermediate automatic speech recognition hypotheses that are generated from an incomplete hypothesis lattice. In other words, the present system can start presenting the word hypotheses, one at a time, to the user before the automatic speech recognition system 200 has completely finished processing the entire hypothesis lattice 560 for the speech recognition result. Thus, the present system can display to the user the first hypothesized word in the speech recognition result after an initial timeout period (such as 500 milliseconds or any other desired timeout period), but before the speech recognition system 200 has generated a hypothesis for the full text fragment or sentence input by the user. This allows the user to begin correcting or confirming the speech recognition result, with a very short latency, even though current mobile devices have relatively limited computational resources.

Figure 6B:
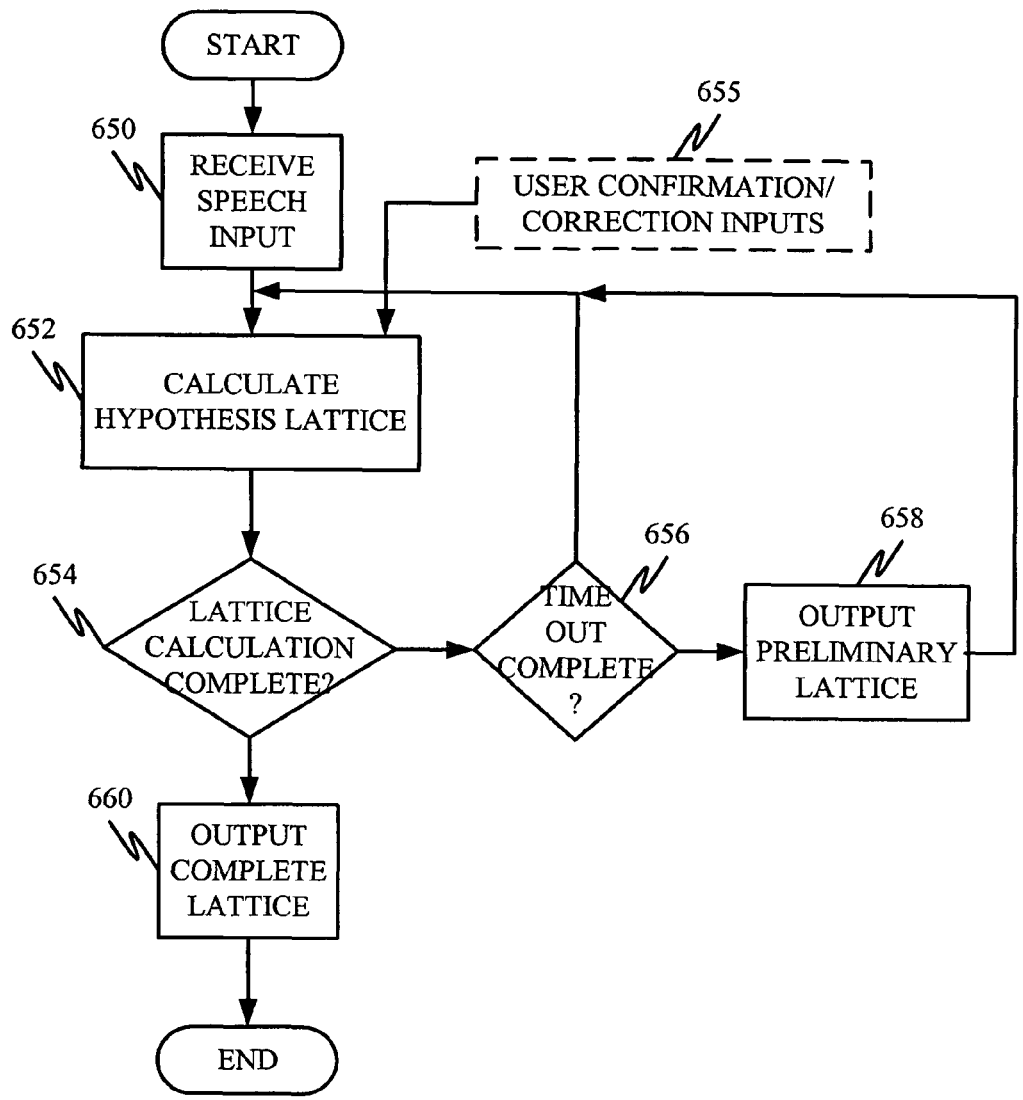
FIG. 6B is a flow diagram illustrating one embodiment of operation of the system in generating a speech recognition hypothesis lattice.
Figure 6C:
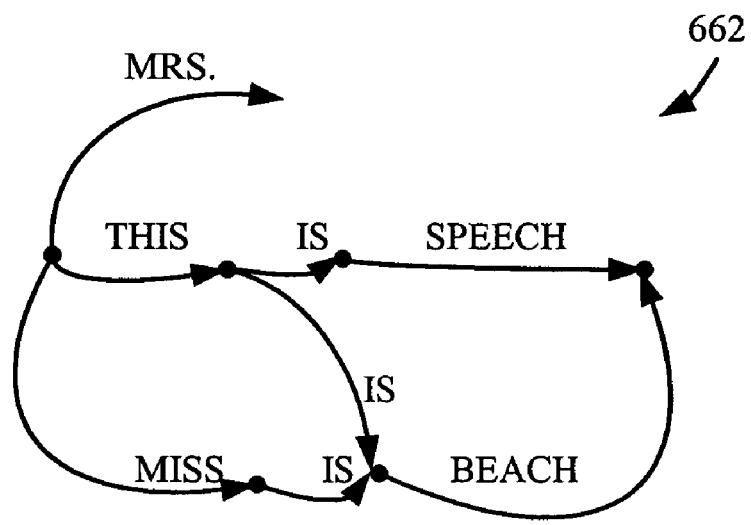
FIG. 6C illustrates one exemplary preliminary hypothesis lattice.

FIG. 6B is a flow diagram better illustrating how the system reduces speech recognition latency. First, the user speaks the entire multi-word speech input 552 to mobile device 10. This is indicated by block 650 in FIG. 6B. The decoder then begins to calculate the hypothesis lattice 560. This is indicated by block 652.

The decoder then determines whether the lattice calculation is complete. This is indicated by block 654. If not, it is determined whether the predetermined timeout period has lapsed. This is indicated by block 656. In other words, even though the complete hypothesis lattice has not been computed, the present system will output an intermediate lattice 560 after a pre-designated timeout period. Therefore, if, at block 656 the timeout period has lapsed, then the preliminary hypothesis lattice 560 is output by the system and the interface component 17 displays the first hypothesized word in the speech recognition result (from the preliminary hypothesis lattice 560) to the user. This is indicated by block 658 in FIG. 6B.

During this time, the decoder continues to calculate the full hypothesis lattice at block 652. However, the interface component 17 illustratively keeps presenting words to the user for confirmation or correction, using the preliminary hypothesis lattice, until the full hypothesis lattice is complete. Once the full hypothesis lattice 560 is complete, the complete lattice is output for use by the interface component 17 in sequentially presenting words (one word at a time) to the user for confirmation or correction. This is indicated by block 660 in FIG. 6B.

In one alternative embodiment, as the decoder is calculating the hypothesis lattice, and after it has calculated the preliminary lattice, any user confirmations or corrections to the speech recognition result are feedback to the decoder such that it can complete processing the hypothesis lattice taking into account the user confirmation or correction information. This is indicated by block 655. By providing the committed word sequence to the recognizer 200, this provides information that can be used by the recognizer to narrow the search space. In fact, with this information, the recognizer 200 can prune all search paths that are not consistent with the committed word sequence to significantly speed up the search process. Of course, search path pruning not only speeds up the search, but also improves the accuracy by allowing the engine to search more paths consistent with the already-committed word sequence that would otherwise possibly be pruned.

Figure 6D:
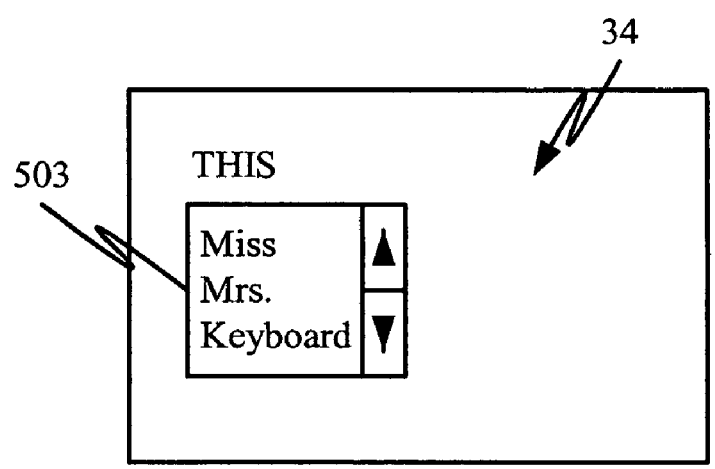
FIG. 6D illustrates an exemplary user interface display for selecting a word.

An example may enhance understanding at this point. Assume that the user 556 has activated the speech recognition system 200 on device 10. Assume further that the user 556 has entered the multi-word speech input 552 "this is speech recognition" into the device 10 through its microphone 75. The automatic speech recognition system 200 in device 10 begins processing that speech input to create a hypothesis lattice 560 indicative of the hypothesized speech recognition result and alternates. However, before the entire hypothesis lattice has been calculated by the automatic speech recognition system 200, a preliminary lattice 560 may illustratively be calculated. FIG. 6D illustrates one exemplary partial (or preliminary) hypothesis lattice generated from the exemplary speech input. The hypothesis lattice is generally indicated by numeral 662 in FIG. 6D. In accordance with one embodiment, lattice 662 is provided to the user interface component 17 such that user interface component 17 can begin presenting the words from the hypothesized speech recognition result to the user 556, one word at a time, for confirmation or correction.

Figure 6E:
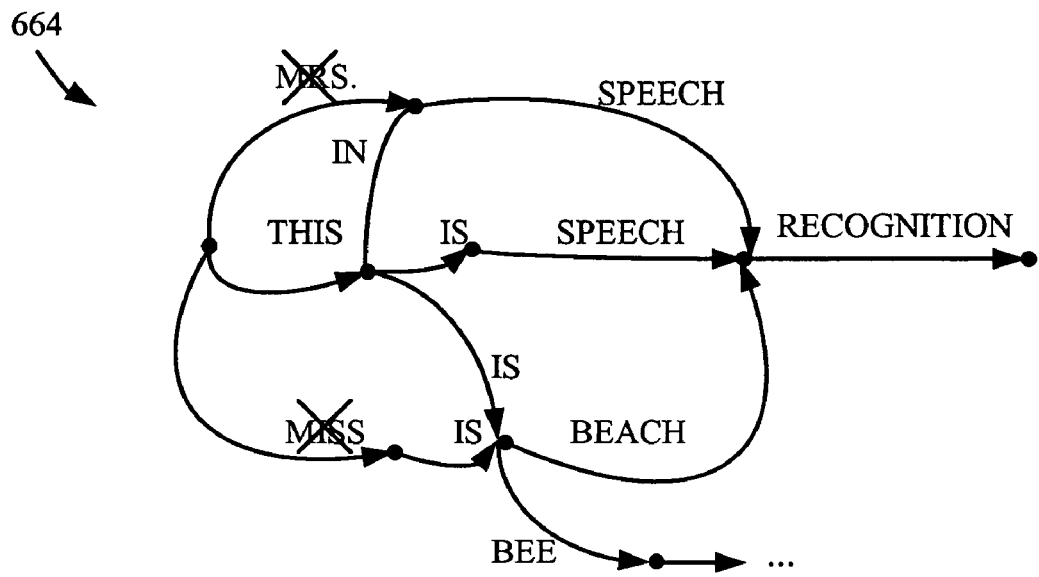
FIG. 6E illustrates a modified hypothesis lattice given user correction of a word in the hypothesis.

Assume that, from lattice 662, the word "this" is the first word in the lattice that represents a best hypothesis word. The word "this" will therefore be presented to the user for confirmation or correction. FIG. 6E illustrates a portion of display 34 of device 10 showing that the word "this" is presented to the user, along with the alternates from hypothesis lattice 662, presented in order of probability score, in drop down menu 503. The alternates listed in menu 503 are "Miss" and "Mrs.". It can be seen from lattice 662 that these are the other possible alternates to "this" from the lattice. The user can then either accept the displayed result "this" by simply actuating the "Ok" button or the user can select one of the alternates as described above.

During the time that the user is making a selection to either confirm or correct the displayed speech recognition result, the decoder is continuing to process the speech input in order to complete computation of the speech recognition lattice. This may only take on the order of seconds. Therefore, it is likely that even before the user has corrected or confirmed one or two word hypothesis words, the decoder will have completely calculated the entire hypothesis lattice.

FIG. 6E illustrates the entire hypothesis lattice 664 calculated by the decoder for the exemplary speech input "this is speech recognition". Because the user has selected "this" as the first word in the speech recognition result, the other two alternates "Mrs." and "Miss" are crossed out on lattice 664 to show that they will no longer be considered in hypothesizing additional words in the speech recognition result. In fact, since the user has confirmed the word "this", the decoder knows for certain that "this" was the proper first word in the recognition result. The decoder can then recompute the probabilities for all of the other words in lattice 664, and user interface component 17 can present the best scoring word, based on that recomputation, to the user as the next hypothesis word in the recognition result.

Figure 6F:
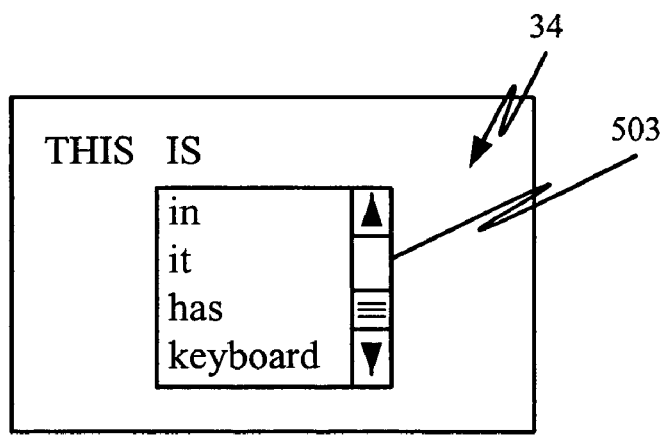
FIG. 6F illustrates one exemplary user interface display for selecting a word in the speech recognition hypothesis.

FIG. 6F shows that the interface has now displayed the word "is" to the user as the best scoring hypothesis word that follows "this" in the speech recognition result. FIG. 6F shows that a drop down menu 503 is also displaying a plurality of alternates for the word "is", along with a scroll bar which can be used to scroll among the various alternates, should the user elect to correct the speech recognition result by selecting one of the alternate words.

It will also be noted that in the embodiment shown in FIG. 6F, drop down menu 503 includes a "keyboard" option, which can be actuated by the user in order to have a keyboard displayed such that the user can enter the word, one letter at a time, using a stylus or other suitable input mechanism.

Figure 7:
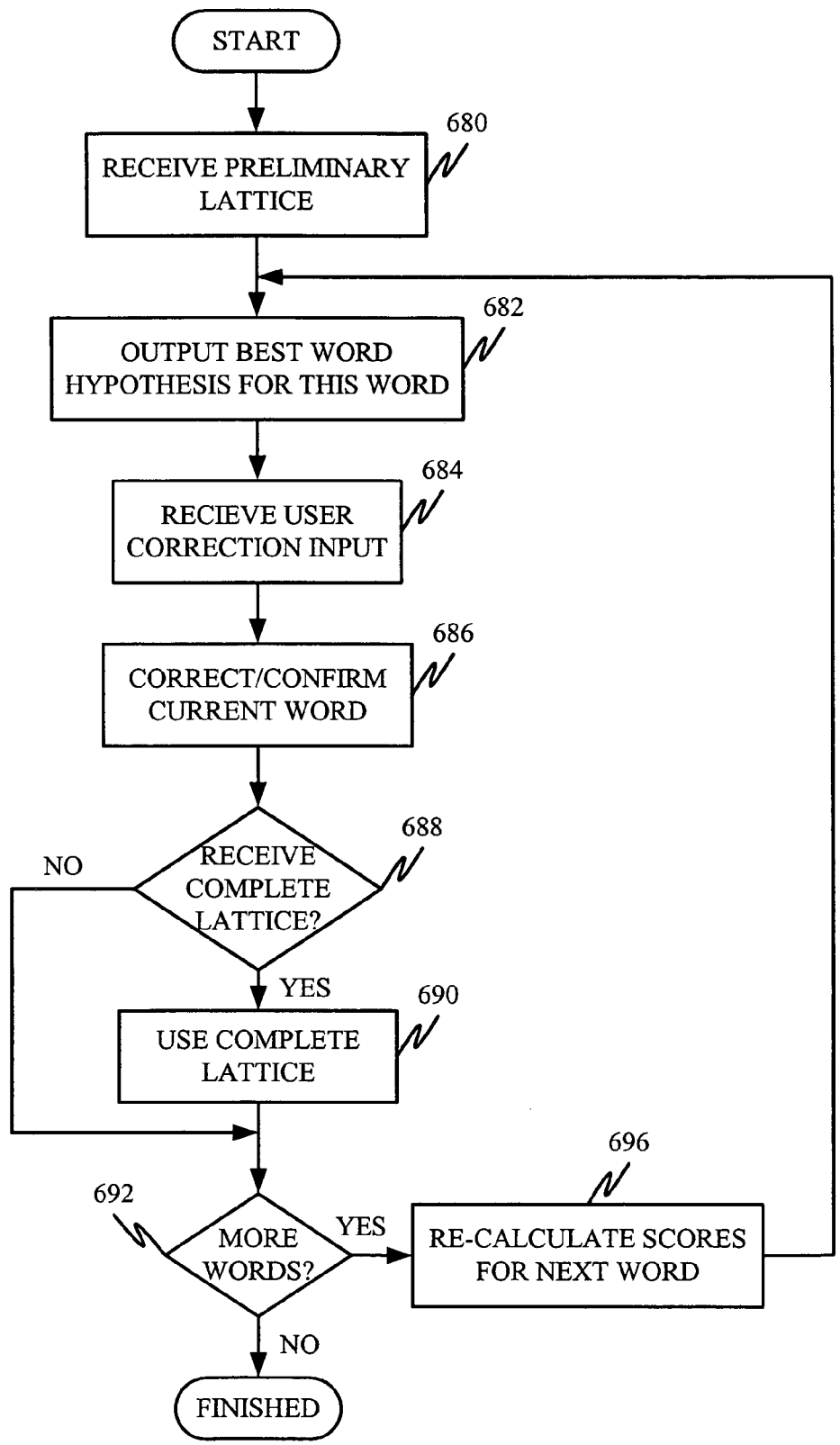
FIG. 7 shows one exemplary flow chart illustrating recomputation of hypotheses.
Figure 8:
FIG. 8 illustrates one exemplary user interface display showing predictive word completion.
Figure 8:
Figure 8:

FIG. 7 is a flow diagram better illustrating the operation of the system shown in FIG. 6 in using the preliminary and complete lattices 662 and 664 in accordance with one embodiment of the invention. As discussed above with respect to FIG. 6B, the user interface component 17 first receives the preliminary hypothesis lattice (such as lattice 662 shown in FIG. 6D). This is indicated by block 680 in FIG. 6.

The user interface component 17 then outputs a best word hypothesis for the current word in the speech recognition result. For instance, if this is the first word to be displayed to the user for correction or confirmation, then the user interface component 17 selects the best scoring word from the preliminary hypothesis lattice for the first word position in the speech recognition result and displays that to the user. This is indicated by block 682 in FIG. 6 and an example of this is illustrated in FIG. 6E.

User interface component 17 then receives the user correction or confirmation input 554 with respect to the currently displayed word. This is indicated by block 684 in FIG. 6. Again, this can be by the user selecting an alternate from the alternate list, by the user beginning to type a word that is not in the hypothesis lattice but that is still found in the dictionary or vocabulary used by the automatic speech recognition system 200, or by the user entering a new word which was not previously found in the vocabulary or lexicon of the automatic speech recognition system 200.

It will be noted that, in the second case (where the user begins to type in a word not found in the hypothesis lattice but one that is found in the lexicon used by the automatic speech recognition system 200) prefix feedback can be used. This is better illustrated in FIG. 8. Assume, for instance, that the correct word for the speech recognition result under consideration is "demonstrates". Assume also that the word "demonstrates" did not appear in the hypothesis lattice generated by the automatic speech recognition system 200 based on the speech input 552. However, assume that the word "demonstrates" is in the lexicon used by the automatic speech recognition system 200. In that case, the user will begin typing the word (such as by selecting the keyboard option or the multitap input option) one letter at a time. As the user enters each letter, the automatic speech recognition system 200 uses predictive word completions based on the prefix letters already entered. In one illustrative embodiment, the system also highlights the letters which have been entered by the user so that the user can easily determine which letters have already been entered. It can be seen in FIG. 8 that the user has entered the letters "demon" and the word "demonstrates" has been predicted.

It will also be noted that this option (of entering the word one letter at a time) can be used even where the word already appears in the hypothesis lattice. In other words, instead of the user scrolling through the alternates list in the drop down menu 503 in order to find the correct alternate, the user can simply enter the input configuration which allows the user to enter the word one letter at a time. Based on each letter entered by the user, the system 200 recomputes the probabilities of various words and re-ranks the displayed alternates, based on the highest probability word given the prefixes.

In one embodiment, in order to rerank the words, reranking is performed not only based on the prefix letters already entered by the user, but also on the words appearing in this word position in the speech recognition hypothesis, and also based on the prior words already confirmed or corrected by the user and further based on additional ranking components, such as a context dependent component (e.g., an n-gram language model) given the context of the previous words recognized by the user and given the prefix letters entered by the user.

In any case, receiving the user correction or confirmation input 554 is indicated by block 684 in FIG. 7. User interface component 17 corrects or confirms the word based on the user input, as indicated by block 686 in FIG. 6.

If the word just confirmed or corrected is one of the first few words in the speech recognition result, it may be that the user interface component 17 is providing hypothesis words to the user based on a preliminary lattice, as described above with respect to FIG. 6B. Therefore, it is determined whether the complete lattice has been received. This is indicated by block 688 in FIG. 6. If so, then the complete lattice is used for all future processing as indicated by block 690. If the complete lattice has not yet been received, then the preliminary lattice is again used for processing the next word in the speech recognition result.

Once the current word being processed has been confirmed or corrected by the user, the user interface component 17 determines whether there are more words in the hypothesized speech recognition result. This is indicated by block 692 in FIG. 7.

If so, then the automatic speech recognition decoder recalculates the scores for each of the possible words that might be proposed as the next word in the speech recognition result. Again, this recalculation of scores for the next word can be based on words already confirmed or corrected by the user, based on the words found in the hypothesis lattice, based on language model scores, or based on other desired modeling scores.

In order to generate candidate words from the lattice, it is first determined what set of candidate words are reachable from the initial lattice node through the confirmed sequence of words corresponding to this result. This list of words associated with outgoing arcs in the lattice, from these candidate nodes, form the candidate words predicted by the lattice. For instance, in the lattice 664 shown in FIG. 6F, assuming that the words "this is" have been confirmed or corrected by the user, then the alternates possible given the already-confirmed words in the speech recognition result are "speech", "beach", and "bee".

To determine the probability of each candidate word, the forward probability of each candidate node is computed by combining probabilities of matching paths using dynamic programming. For each candidate word transition, the overall transition probability is computed from the posterior forward probability, local transition probability and backwards score. The final probability of each candidate word is determined by combining the probabilities from corresponding candidate word transitions. In one embodiment, probability combination can be computed exactly by adding the probabilities or estimated in the Viterbi style by taking the maximum. In order to reduce computation, the candidate nodes and corresponding probabilities are computed incrementally, as the user commits each word. It will be noted, of course, that this is but one way to calculate the scores associated with the next word in the speech recognition result. Recalculating the scores based on this information is indicated by block 696 in FIG. 7.

If, at block 692, there are no more words to be processed, then the speech recognition result is complete, and processing has finished.

It can be seen that by combining keypad and speech inputs for text entry on a mobile device, when a word is misrecognized, the sequential commit paradigm outperforms traditional random access correction. It takes fewer keystrokes and the utterance allows the system to show word alternates with different segmentations, while presenting the results in a very straight-forward manner. Therefore, when the correct recognition is represented by the recognition lattice, users will not have to correct multi-word phrases due to incorrect word segmentation, resulting in even fewer keystrokes. This also avoids the issue of combinatorial explosion of alternates when multiple words are selected for correction.

Further, knowledge of previously committed words allows the system to re-rank the hypotheses according to their posterior probabilities based on language model and acoustic alignment with the committed words. Thus, perceived accuracy is higher than traditional systems where the hypothesis for the remainder of the utterance cannot change after a correction. By displaying only the next word to be corrected and committed, the sequential commit system improves perceived accuracy and leads to a reduction in keystrokes.

Similarly, sequential commit is based on the one word at a time entry interface familiar to users of existing text input methods. In situations where speech input is not appropriate, the user can simply skip the first step of speaking the desired utterance and start entering text using only the keypad. Thus, the system is very flexible.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of entering information into a mobile device, comprising:
   receiving a multi-word speech input from a user;
   performing speech recognition on the speech input to obtain a multi-word speech recognition result; and
   sequentially displaying, in a display, words in the speech recognition result for user confirmation or correction, by adding one word at a time to the display, regardless of how many words are in the speech recognition result, and only displaying a next word in the speech recognition result after user confirmation or correction has been received for a previously displayed word that is immediately preceding the next word in the speech recognition result;
   wherein performing speech recognition comprises:
      calculating a hypothesis lattice indicative of a plurality of speech recognition hypotheses based on the speech input;
      prior to finishing calculating the hypothesis lattice and while continuing to calculate the hypothesis lattice, calculating a preliminary hypothesis lattice indicative of only partial speech recognition hypotheses based on the speech input and outputting the preliminary hypothesis lattice; and
      wherein sequentially displaying the speech recognition result for user correction or confirmation comprises displaying the speech recognition result first using the preliminary hypothesis lattice, until the hypothesis lattice is completely calculated, and then displaying the speech recognition result using the completely calculated hypothesis lattice.

2. The method of claim 1 and further comprising:
   receiving a user input indicative of user correction or confirmation of a given, displayed word.

3. The method of claim 2 wherein receiving a user input comprises:
   receiving an alternate modality input indicative of user actuation of an input mechanism on the mobile device.

4. The method of claim 3 wherein sequentially displaying the speech recognition result, one word at a time comprises:
   displaying a best hypothesis word; and
   displaying a list of alternate words proximate the best hypothesis.

5. The method of claim 4 wherein receiving an alternate modality input comprises:
   receiving a user selection of one of the alternate words.

6. The method of claim 4 wherein receiving an alternate modality input comprises:
   receiving a user typing input indicative of a user inputting a desired word, one letter at a time.

7. The method of claim 1 wherein performing speech recognition comprises calculating a sequence of likely words corresponding to the speech input, and further comprising:
   prior to adding the next word to the display of the speech recognition results, after the given displayed word, recalculating the hypothesis lattice based on the user input indicative of user correction or confirmation of the given displayed word.

8. The method of claim 7 wherein displaying comprises:
   adding the next word to the display, based on the recalculation of the hypothesis lattice.

9. A mobile device, comprising:
   a speech recognizer;
   a user interface component receiving a speech recognition result from the speech recognizer indicative of recognition of a multi-word speech input and sequentially displaying words in the speech recognition result by displaying a next word in the speech recognition result and displaying a plurality of alternate words in a list as alternates to the displayed next word, wherein the next word in the speech recognition result and the plurality of alternate words are automatically displayed after a previously output word in the speech recognition result has been confirmed or corrected by a user and before any words following the next word in the speech recognition result are displayed, the user interface component adding only the next word and the plurality of alternate words to the display, regardless of how many additional words are in the speech recognition result following the next word, and wherein the user interface component is configured to receive a user input that identifies one of the alternate words in the list as being a correct word in the speech recognition result; and
   wherein the speech recognizer provides the speech recognition result to the user interface component by calculating a likely recognition hypothesis lattice indicative of a plurality of speech recognition hypotheses based on the speech input, and wherein the speech recognizer is configured to recalculate the recognition hypothesis lattice based on the user input that identifies one of the alternate words in the list, and wherein a subsequent word following the identified correct word in the speech recognition result is displayed and a plurality of alternate words are provided for the subsequent word based on the recalculation of the recognition hypothesis lattice.

10. The mobile device of claim 9 and further comprising:
    a display, the user interface component being configured to output the speech recognition result by sequentially displaying the speech recognition result on the display.

11. The mobile device of claim 10 wherein the speech recognizer provides the speech recognition result by outputting a preliminary recognition hypothesis lattice indicative of a preliminary, likely sequence of words and wherein the user interface component displays the speech recognition result to the user initially based on the preliminary, recognition hypothesis lattice.

12. The mobile device of claim 9, wherein the user confirmation comprising the user input does not modify the displayed word in the speech recognition result.

13. A mobile device, comprising:
    a user actuable input modality component;
    a display;
    a speech recognition system configured to calculate a hypothesis lattice indicative of a plurality of speech recognition hypotheses based on a received multi-word speech input, wherein, prior to finishing calculating the hypothesis lattice and while calculating the hypothesis lattice, the speech recognition system calculates a preliminary hypothesis lattice indicative of only partial speech recognition hypotheses for the multi-word speech input and outputs the preliminary hypothesis lattice; and a user interface component configured to display a list of words indicative of the received multi-word speech input, wherein each word in the list is sequentially displayed for user confirmation or correction prior to displaying a next word in the list, regardless of a number of words in the list, and wherein the next word in the list is displayed only after receiving user confirmation or correction for an immediately previous word in the list, wherein a portion of the list of words indicative of the received multi-word speech input is first displayed using the preliminary hypothesis lattice, until the hypothesis lattice is completely calculated, and then the list of words indicative of the received multi-word speech input is displayed using the completely calculated hypothesis lattice.

14. The user interface of claim 13 wherein the user confirmation is provided through the user actuable input modality component.

15. The user interface of claim 14 wherein the user actuable input modality component comprises one of a keypad, a soft keyboard, a handwriting input component, and a touch screen.

16. The user interface of claim 13 wherein the user interface component is configured to display, along with each word in the list, a set of alternate words for user selection.

17. The mobile device of claim 13, wherein the user confirmation comprising the user input does not modify the displayed word in the list of words.

* * * * *